G. W. THOMPSON.
RESILIENT WHEEL.
APPLICATION FILED JULY 14, 1915.
1,203,939.
Patented Nov. 7, 1916.
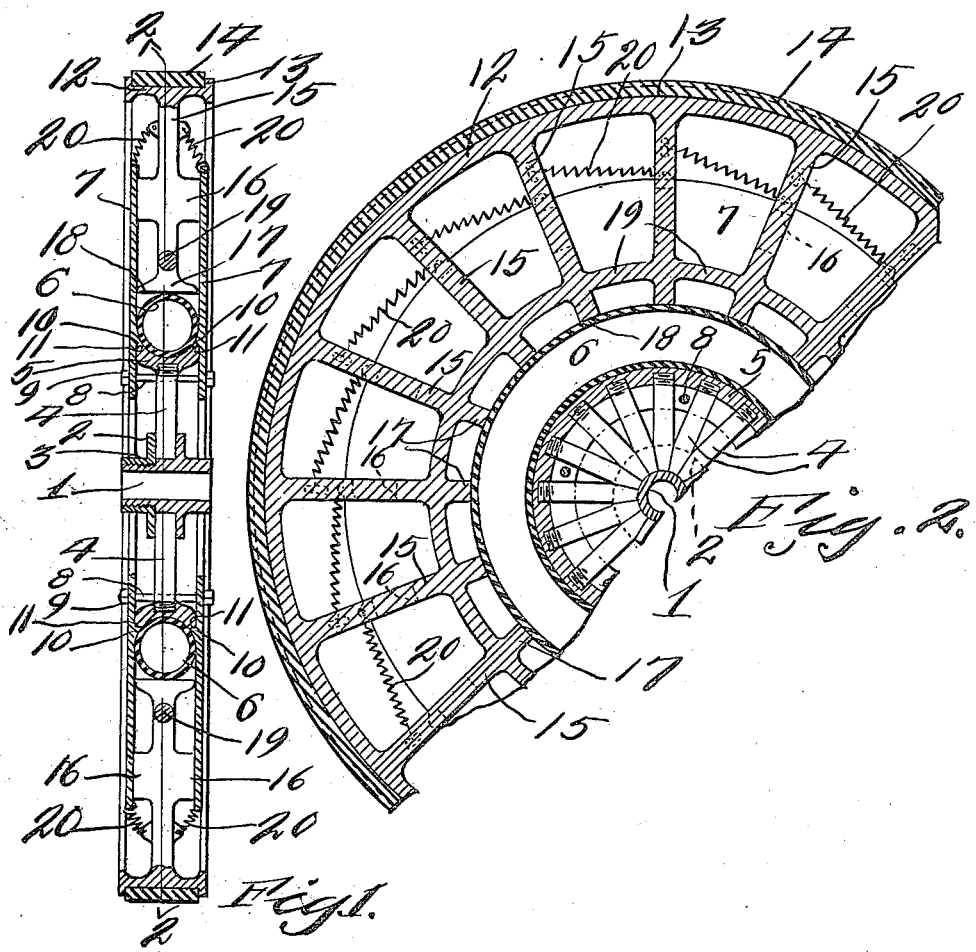
Inventor
G. W. Thompson

UNITED STATES PATENT OFFICE.

GEORGE W. THOMPSON, OF SPRINGFIELD, MISSOURI.

RESILIENT WHEEL.

1,203,939.   Specification of Letters Patent.   Patented Nov. 7, 1916.

Application filed July 14, 1915. Serial No. 39,833.

*To all whom it may concern:*

Be it known that I, GEORGE W. THOMPSON, a citizen of the United States, residing at Springfield, in the county of Greene and State of Missouri, have invented a new and useful Resilient Wheel; and I do hereby declare the following to be a full, clear, and exact description of the invention, such as will enable others skilled in the art to which it appertains to make and use the same.

This invention relates to an improved resilient wheel, and an object of the invention is to provide a device of this nature comprising improved features of construction.

One of the features of construction is the provision of a hub structure, between which and the wheel rim and spoke structure pneumatic means are arranged, there being oppositely arranged concentric plates to hold such parts in their proper relative positions, there being resilient coil springs for holding the wheel rim and the spoke structure concentric with the hub structure.

In practical fields the details of construction may necessitate alterations, falling within the scope of what is claimed.

The invention comprises further features and combination of parts, as hereinafter set forth, shown in the drawings and claimed.

In the drawings:—Figure 1 is a sectional view through the wheel constructed in accordance with the invention. Fig. 2 is a sectional view on line 2—2 of Fig. 1.

Referring to the drawings, 1 designates the hub, between the annular flanges 2 (which are secured to the hub 1 as shown at 3) of which are the spokes 4 of the hub structure. The spokes 4 are secured in any suitable manner to the hub rim 5, which is substantially semi-circular in cross section, to receive the pneumatic tube 6. Oppositely arranged concentric plates 7 are bolted together by means of the bolts 8 and nuts 9, which bolts 8 pass between the spokes 4. The inner faces of the plates 7 are provided with annular shoulders 10 to engage annular edges 11 of the hub rim 5, to hold the plates concentric with the hub 1. The wheel rim 12 is provided with the usual channel 13 to receive the tire 14, which may be constructed of any suitable material, rubber or the like. The wheel rim 12 is provided with a plurality of spokes 15 extending radially toward the hub 1, and are supplied with laterally extending portions 16, which contact with the inner faces of the plates 7. The inner ends of the spokes 15 terminate in enlargements 17, which also slide against the inner surfaces of the plates 7. The flat faces 18 of the enlargements 17 bear against the pneumatic tube. The inner portions of the spokes 15 adjacent their enlargements are connected to one another as shown at 19. Connecting the outer edge of each plate 7 and the spokes 15 adjacent the wheel rim 12 are coil springs 20, which act to hold the wheel rim and the spokes concentric to the hub 1 substantially.

The invention having been set forth, what is claimed as new and useful is:—

A resilient wheel comprising a hub having a hub rim provided with a seat for a pneumatic, a pneumatic in said seat, a pair of plates bolted together, one upon each side of the hub rim, the adjacent faces of said plates having annular shoulders to engage the annular edges of the hub rim partially between the pneumatic and the hub rim, the adjacent faces of the plates beyond the shoulders merging or curving into said shoulders partially under the sides of the puenmatic and forming continuations of the seat for the pneumatic, a wheel rim having an integral skeleton extension wheel frame operable between the two plates, said wheel frame comprising a plurality of radial spokes, each being thinner in diameter than the space between the two plates, said spokes at their inner ends terminating in enlargements of widths equal to the space between the plates and engaging said pneumatic and sliding against the adjacent faces of the plate, said spokes adjacent said seat having integral connections spaced at intervals from the pneumatic, said spokes substantially at their central portions having laterally extending parts to slide in contact with the adjacent faces of the plate, and resilient connections between the wheel rim and the outer peripheral edge of said plate.

In testimony whereof I have signed my name to this specification in the presence of two subscribing witnesses.

GEORGE W. THOMPSON.

Witnesses:
S. W. TICKLE,
D. M. HUFFMAN.

Copies of this patent may be obtained for five cents each, by addressing the "Commissioner of Patents, Washington, D C."